United States Patent [19]

Shoshan

[11] Patent Number: 4,858,239
[45] Date of Patent: Aug. 15, 1989

[54] LASER SYSTEM

[75] Inventor: Itamar Shoshan, Ramat, Israel

[73] Assignee: Elop Electrooptics Industries Ltd., Rehovot, Israel

[21] Appl. No.: 199,283

[22] Filed: May 26, 1988

[51] Int. Cl.$^4$ .............................................. H01S 3/10
[52] U.S. Cl. ......................................... 372/9; 372/33; 372/106; 372/108
[58] Field of Search ................... 372/93, 98, 18, 92, 372/68, 99, 108, 107, 96

[56] References Cited

U.S. PATENT DOCUMENTS

| | | | |
|---|---|---|---|
| 3,813,613 | 5/1972 | Danielmeyer et al. | 372/68 |
| 3,995,230 | 11/1976 | See | 372/93 |
| 4,050,035 | 9/1977 | Wuerker et al. | 372/93 |
| 4,099,141 | 7/1978 | Leblanc et al. | 372/93 |
| 4,276,519 | 6/1981 | Marteau | 372/103 |
| 4,554,666 | 11/1985 | Altman | 372/68 |
| 4,731,788 | 3/1988 | Shoshan | 372/9 |

Primary Examiner—Leon Scott, Jr.
Attorney, Agent, or Firm—Browdy and Neimark

[57] ABSTRACT

The invention relates to means for generating a laser beam with an essentially constant angle of divergence over a wide range of operating conditions. The invention further relates to a method of generating such laser beam. The oscillator-amplifier laser system of the invention comprises in combination an optical resonator, a first active medium and first optical means located within said resonator for generating an oscillator beam; a second active medium for amplifying said oscillator beam and a second optical means external to said resonator. Said first and second optical means have each, according to the invention, a predetermined optical power which maintains a constant divergence-angle of the output beam, even under variations in the induced optical power of the active media. Thus, there is provided an oscillator-amplifier laser system provided with optical means resulting in a beam having an essentially constant divergence angle over a wide range of operating conditions, and particularly over a wide range of repetition rates.

14 Claims, 1 Drawing Sheet

LASER SYSTEM

FIELD OF THE INVENTION

The invention relates to a laser system comprising a laser oscillator and amplifier provided with optical means resulting in a beam having an essentially constant divergence angle over a wide range of operating conditions.

BACKGROUND OF THE INVENTION

A laser device consists usually of an active medium located within an optical resonator formed by two mirrors, resulting in a laser beam transmitted through one of these mirrors. One of the basic properties of laser beams is their small divergence angle which is particularly important in applications where such a beam is transmitted to long distances or focused to a small spot. Since the performance of the laser beam depends on its divergence angle such angle ought to be essentially constant under various operating conditions.

In many lasers, and particularly in solid-state lasers, the divergence angle is affected by the heating of the active medium and as a result depends on the operating conditions. In solid-state lasers the active medium is usually in the form of a cylindrical rod that is excited by absorbing the radiation emitted from a flashlamp. As a result of this excitation the rod is heated and needs cooling by a cooling liquid flowing over its surface. A combined effect of such heating and cooling is the formation of a radial temperature gradient across the rod, due to which the rod acts in the laser resonator as a lens with an optical power $\phi$ that is determined by the average heating power applied on the rod. In multimode lasers, this optical power determines the divergence angle $\theta$ of the output beam. In the case of a laser with a resonator formed by two plane-mirrors the divergence-angle may be calculated by the approximate formula:

$$\theta \simeq D_o(\phi/L)^{\frac{1}{2}} \quad (1)$$

where $D_o$ is the diameter of the beam, L is the resonator length defined as the distance between the mirrors, and $\phi$ is the optical power of the heated active medium. As can be seen from Eq(1) a strong thermal lensing in the active medium tends to increase the divergence of the output beam. To overcome such increase in beam divergence, there is introduced into the resonator a negative (concave) lens which compensates the thermally-induced optical power of the active medium. The compensation is effective only for a specific value of $\phi$. Any variation in the electrical voltage on the flashlamp or in the repetition rate of the flashes affects the thermal lensing of the active medium so that it is no more exactly compensated by the fixed concave lens.

As a result, the divergence of the output beam varies with variations of the operating conditions.

A possible solution to the problem of variation in rod thermal lensing is to introduce a dynamic compensator into the resonator. Such a compensator consists for example of a pair of lenses—one concave and one convex—with a variable spacing between them so that their common equivalent focal length is variable. The spacing between the lenses is varied according to the variation in operating conditions so that the rod thermal lensing is always compensated, thereby maintaining a fixed divergence of the generated beam. This solution however suffers from the inconvenience of using in the laser resonator moving optical elements which have to be adjusted according to operating conditions.

Another solution to the problem of variation in rod thermal lensing is based on the design of a resonator which is insensitive to variation in focal length of the pumped active medium. Several designs have been proposed for the realization of such resonators referred to as "dynamic stable resonators".

One of these designs proposed by Steffen et al in *IEEE Journal of Quantum Electronics* volume QE-8, page 239 (1982) uses a "semiconfocal resonator" in the form of two plane mirrors with the laser rod close to one mirror and the mirrors spaced by half the focal length of the rod's thermal lens. An obvious disadvantage of this design is the inconveniently long resonator.

Another design proposed by Chesler and Maydan in *Journal of Applied Physics*, Volume 43, page 2254 (1972) uses a "convex-concave resonator" in which there are one convex and one concave mirror. While operating successfully, the laser constructed according to this design is limited to low power operation because of the risk of damage to the convex mirror when the beam diameter is very small. This precludes the use of this design in high power Q-switched lasers.

Still another "dynamic stable resonator" design is the "telescopic resonator" used by Hanna et al and described in *Optical and Quantum Electronics*, 13, 493 (1981). In this design, a beam expander inserted into the laser resonator can be adjusted so as to make the resonator insensitive to variations in the rod's focal length. However, as in the "convex-concave resonator", in the "telescopic resonator" too, a small beam diameter is obtained on one of the mirrors so that the use in high power Q-switched lasers is precluded.

Another prior art design which is relevant to the present invention is the laser oscillator-amplifier configuration. In this configuration a low-power oscillator generates an oscillator beam which is amplified by the amplifier thus producing a high-power beam. The oscillator consists of an active medium located within the resonator defined by two mirrors. The amplifier consists of a second active medium external to the resonator. In such systems both active media are subject to thermal lensing which depends on the operating conditions, e.g. the pumping power or the pulse repetition rate.

The thermal lensing of each of the active media may be compensated separately by the use of optical means (lenses or mirrors). In the oscillator such a compensation is done for example by the insertion of a diverging (negative) lens somewhere between the mirrors or by making one of the mirrors with a convex reflecting surface. The thermally-induced optical power of the amplifier is similarly compensated by adding a diverging lens on either side of the active medium.

Usually, both active media are compensated for some specific operating conditions for example for specific pumping levels of the active media and for a specific pulse repetition rate. In such systems the active medium of the oscillator is usually compensated first so that the oscillator beam has an optimum beam divergence at some specific operating conditions for example at one particular repetition rate. Then, the amplifier is compensated by adding a lens designed for optimum beam divergence of the output beam at the same particular repetition rate. In this way, the laser system is optimized for one particular repetition rate. At higher and lower repetition rates the output beam becomes more divergent. Another drawback is the reduced energy and the poor stability of the laser at repetition rates lower than that for which it was optimized, resulting from the fact that the resonator becomes unstable at these repetition rates.

SUMMARY OF THE INVENTION

It is an object of the present invention to provide a laser system which delivers a beam with a nearly constant divergence-angle, over a wide range of operating conditions, and particularly over a wide range of repetition rates.

This object is achieved according to the invention in an oscillator-amplifier laser system. This system consists of an optical resonator, a first active medium located within said optical resonator in which an oscillator beam is generated, a first optical means located within said optical resonator with optical power nearly equal in magnitude and opposite in sign to the thermally-induced optical power of said first active medium when pumped at the extreme operating conditions at which this induced optical power is minimal (e.g. at the lowest repetition rate), a second active medium located external to said optical resonator for amplification of said oscillator beam and generation of an amplified beam, a second optical means located external to said optical resonator on either side of said second active medium with optical power nearly equal in magnitude and opposite in sign to the thermally-induced optical power of said second active medium when pumped at the extreme operating conditions in which this induced optical power is maximal (e.g. at the highest repetition rate), said system being designed for obtaining an output beam with a constant divergence angle that is essentially insensitive to variations in the induced optical power of said active media.

The following description is by way of illustration only and it shall not be construed in a limitative manner.

BRIEF DESCRIPTION OF THE DRAWINGS

The invention will be more fully understood and appreciated from the following detailed description of the preferred embodiment taken in conjunction with the drawings in which.

DETAILED DESCRIPTION OF THE PREFERRED EMBODIMENTS

Figure 1:
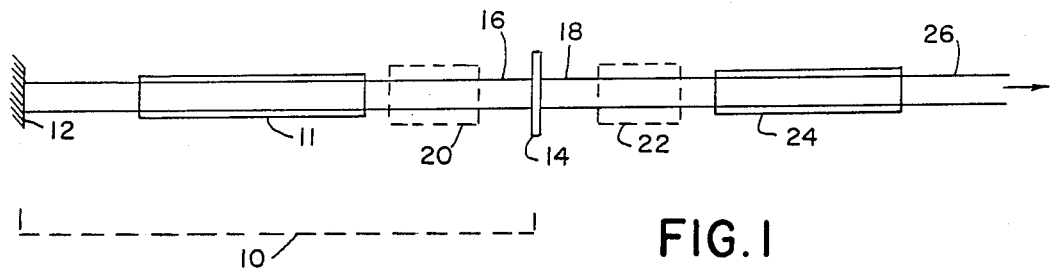
FIG. 1 is a schematic block diagram of an oscillator-amplifier laser system according to the invention.

FIG. 1 is a schematic diagram of a laser system according to the invention. This comprises an oscillator 10 which includes a first active medium 11 located within an optical resonator formed by two parallel plane mirrors 12 and 14. Mirror 14 is semi-transparent so that a portion of the intracavity beam 16 is coupled out of the resonator as an oscillator beam 18. Optical means 20 located within the resonator has a fixed optical power $-\phi_o^{min}$ equal in magnitude and opposite in sign to $+\phi_o^{min}$ the thermally-induced optical power of active medium 11 at the extreme operating conditions in which this induced optical power is minimal (e.g. at the lowest repetition rate at which the system is designed to operate).

A second optical means 22 located outside the optical resonator between mirror 14 and second active medium 24 is designed to have a fixed optical power $-\phi_a^{max}$ equal in magnitude and opposite in sign to $+\phi_a^{max}$ the thermally-induced optical power of second active medium 24 at the extreme operating conditions in which this induced optical power is maximal (e.g. at the highest repetition rate at which the system is designed to operate). The oscillator beam 18 is amplified in second active medium 24 before exiting the system as output beam 26.

In the laser system illustrated schematically in FIG. 1, the pumping intensities of the active media can be varied at will, and accordingly the optical means can be designed so that the output beam 26 has a constant divergence-angle for all the operating conditions at which the system is designed to operate. This design procedure is presented in the following.

Each of the optical means 20 and 22 may include lenses or mirrors with a negative optical power appropriate for compensation of the thermal lensing in the active media. These optical means 20 and 22 may cause in addition expansion of the beam passing through them so that the beam diameter $D_a$ at the second active medium 24 may differ from the diameter $D_o$ of the intracavity beam 16. In the specific case illustrated in FIG. 1 the first optical means 20 includes a concave lens with optical power $-\phi_o^{min}$ that compensates the thermally-induced optical power $+\phi_o^{min}$ of first active medium 11 with no expansion. The second optical means 22 includes a beam expanding pair of concave and convex lenses with an expansion ratio of m. This pair of lenses is adjusted for a negative optical power $-\phi_a^{max}$ that compensates the thermally-induced optical power $\phi_a^{max}$ of second active medium 24. Thus, $D_a = m \cdot D_o$.

Oscillator beam 18 has a diameter $D_o$ and a divergence angle $\theta$ given by $$\theta \simeq \frac{D_o}{\sqrt{L}} (\phi_o - \phi_o^{min})^{\frac{1}{2}} \qquad (2)$$

This equation differs from Eq(1) due to the optical compensation caused by first optical means 20. The second optical means 22 expands the oscillator beam 18 to diameter $D_a$ and its optical power $-\phi_a^{max}$ compensates exactly the highest value of $\phi_a$—the thermally-induced optical power of second active medium 24.

For $\phi_a < \phi_a^{max}$ the passage through second active medium 24 causes an increase in beam divergence so that the output beam 26 has a divergence angle $$\theta \simeq \frac{D_o^2}{D_a \sqrt{L}} (\phi_o - \phi_o^{min})^{\frac{1}{2}} + D_a (\phi_a^{max} - \phi_a). \qquad (3)$$

When the active media are subject to pulsed pumping their thermally-induced optical powers are given by $$\phi_o = (K E_o R)/D_o^2 \text{ and } \phi_a = (K E_2 R)/D_a^2 \qquad (4)$$

where $E_o$ and $E_a$ are the (assumed constant) pumping energies per pulse for the oscillator and the amplifier respectively, R is the pulse repetition rate of the system and K is a characteristic constant that depends on the physical properties of the active material and on the construction of the pump activity. The active media 11 and 24 were assumed here to have the same diameters $D_o$ and $D_a$ as the beams passing through them.

The condition for the beam divergence to be invariant with changes of the repetition rate R is found by solving the equation $$\theta(R=R^{min}) = \theta(R=R^{max}) \quad (5)$$

after substituting into Eq(3) the equations (4). It is found that this condition is $$E_o/E_a^2 \approx (KL/D_o^2)(R^{max}-R^{min}) \quad (6)$$

If, in addition, $R^{max}-R^{min}$ is not too large so that the condition $$\theta/(d\theta/dR) > R^{max}-R^{min} \quad (7)$$

is satisfied for all values of R between $R^{min}$ and $R^{max}$, then $\theta$ is essentially constant for all repetition rates between $R^{min}$ and $R^{max}$. To achieve this desirable feature, the pumping energies $E_o$ and $E_a$ are designed to satisfy the condition (6). The diameter $D_a$ of the second active medium 24 is chosen according to amplification efficiency considerations.

A special case is the one in which the active media 11 and 24 have equal optical powers, i.e. $\phi_o=\phi_a$. In this particular case the condition for constant divergence is derived by substituting $\phi_a=\phi_o=\phi$ in Eq(3) and solving for $$\theta(\phi=\phi^{min}) = \theta(\phi=\phi^{max}) \quad (8)$$

The condition obtained is
$$(D_o/D_a)^4 \approx L(\phi^{max}-\phi^{max}) \quad (9)$$

The required ratio between the beam diameters $D_o$ and $D_a$ is obtained by beam expansion in either (or both) of the optical means 20 and 22.

If, in addition, $\phi^{max}-\phi^{min}$ is not too large so that the condition $$\theta/(d\theta/d\phi) > \phi^{max}-\phi^{min} \quad (10)$$

is satisfied for all optical powers between $\phi^{min}$ and $\phi^{max}$, then $\theta$ is essentially constant and it is insensitive to variations of the induced optical power in the active media in the range between $\phi^{min}$ and $\phi^{max}$.

The equality in optical powers of the active media is achieved for example in the system illustrated in FIG. 1 when the active media 11 and 24 are identical and are pumped at the same energy (i.e. $E_o=E_a$). Optical means 22 is a beam expander with an expansion ratio that satisfies condition (9). This beam expander is adjusted to have the required optical power $-\phi_a^{max}$ to compensate the thermally-induced optical power of second active medium 24.

Figure 2:
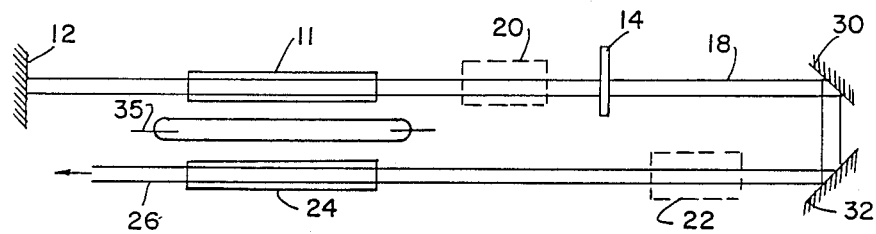
FIG. 2 is a schematic block diagram of another embodiment of the invention in which the active media of the oscillator and of the amplifier are arranged for pumping by a common pumping source.
Figure 3:
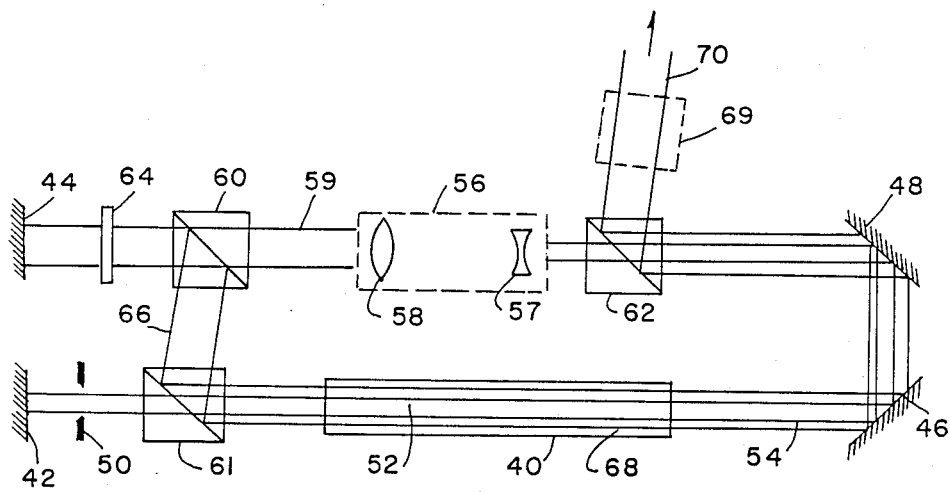
FIG. 3 is a schematic block diagram of another alternative embodiment of the invention in which the oscillator and the amplifier share a single excited medium.

FIGS. 2 and 3 illustrate two alternative embodiments of the invention in which the active media are arranged to have equal induced optical powers.

In the system illustrated in FIG. 2 the active media 11 and 24 are identical in dimensions and are enclosed in a common symmetrical pump cavity for pumping by a common flashlamp 35. Two folding mirrors 30 and 32 direct the oscillator beam 18 to the second active medium 24 where it is amplified. In this example, the first optical means 20 is a beam expander with the expansion ratio required in Eq(9) which is also adjusted to provide the optical power $-\phi^{min}$ required to compensate the thermally induced optical power of first active medium 11. The second optical means in this case is a concave lens with the optical power $-\phi^{max}$.

The advantage of this scheme is that the active media 11 and 24 are subject to the same pumping intensity and the same heating power and are both cooled by a common cooling system. This ensures that thermal lensing in both active media is the same at all operating conditions.

In the embodiment illustrated in FIG. 3 there is shown a laser system in which there is used a single excited medium 40, the central section 52 of which acts as oscillator while the surrounding annular portion 68 acts as amplifier. Laser oscillations occur within the optical resonator formed by the plane mirrors 42 and 44 and folded by the folding mirrors 46 and 48. The diameter of the oscillator section is determined by the aperture 50 positioned within the resonator near mirror 42. First optical means 56 includes a beam expander containing a pair of concave and convex lenses 57 and 58 as shown in FIG. 3. This beam expander provides the expansion required by the condition (9) and is also adjusted to provide the optical power $-\phi^{min}$ required to compensate the thermally-induced optical power of active medium 40. The intracavity beam 54 is polarized in the p-direction by the polarizers 60, 61 and 62 positioned within the resonator. A retardation plate 64 positioned between polarizer 60 and mirror 44 transforms a portion of the expanded intracavity p-polarized beam 59 to the s-polarization which is coupled out of the resonator as the oscillator beam 66. This expanded oscillator beam 66, is s-polarized and thus is reflected by polarizer 61 to achieve medium 40 where it is amplified in the annular amplifier portion 68 unutilized by the narrow intracavity beam 54. The amplified beam is coupled out of the resonator by polarizer 62 and then passes through the second optical means 69 provided by a concave lens with optical power $-\phi^{max}$ before leaving the system as the output beam 70. According to the invention, the output beam 70 has essentially a constant divergence angle for a wide angle of operating conditions.

An obvious advantage of this particular embodiment is that the same optical power is induced in the oscillator and in the amplifier portions of the excited medium at all operating conditions. Another advantage is the reduced beam divergence which is due to the use of a resonator with a small Fresnel number.

A specific illustration of the invention is now presented through a description of the design parameters of a Neodymium:YAG solid-state laser according to the embodiment illustrated in FIG. 3. The active medium 40 is an anti-reflection coated Nd:YAG rod 6.3 mm in diameter and 100 mm long. Mirrors 42, 44, 46 and 48 are 100% reflecting mirrors at 1.06 microns. The retardation plate 64 is a quarter-wave plate for 1.06 microns adjusted for maximum output energy. Aperture 50 has a diameter of 3.8 mm. Optical pumping of the laser rod active medium 40 is performed in a close-coupled pump cavity by a Xenon filled flashlamp with a bore diameter of 4 mm and an arc length of 88 mm. Cooling of the laser rod is achieved by circulating water. The total length of the folded resonator is 110 cm. Such a laser system was designed for operation at various repetition rates between 5 and 20 pulses per second at a constant pumping energy of 10 joules per pulse. The thermally-induced optical power of the laser rod was found to vary between 0.035 and 0.140 diopters (focal length between 7 and 28 meters) at these operating conditions. According to Eq(9) an expansion ratio of 1.7 is needed. First optical means 56 was accordingly a beam expander with ×1.7 expansion ratio. It was adjusted for an optical power of −0.035 diopters ($=-\phi^{min}$). The second optical means was a ×1.5 beam expander that was adjusted for an optical power of −0.14 diopters ($=-\phi^{max}$). The laser system was operated with a Q-switching crystal inserted within the resonator between the first optical means 56 and polarizer 60. The laser system was operated at repetition rates of 5, 10 and 20 pulses per second. An energy of 150 millijoules per pulse and a far-field divergence angle of 0.65 milliradians were measured. This divergence angle was found to be essentially constant and insensitive to variations of the repetition rate.

In all the embodiments described above the oscillator beam was amplified during a single passage through the second active medium. However, the principles of the invention may be applied also to arrangements in which the oscillator beam undergoes two or more passages through the second active medium. The same principles are also applicable to laser systems comprising several amplifiers.

I claim:

1. A method of generating a laser beam with an essentially constant angle of divergence which comprises:
   a. generating a laser beam in a laser oscillator comprising a first solid-state medium,
   b. passing the resulting beam through a second solid-state medium and second optical means which compensates the thermally-induced optical power of the second active medium under operating conditions at which optical power is maximal,
resulting in a desired constant divergence beam.

2. A method according to claim 1 wherein said generating of said laser beam is carried out in said laser oscillator further comprising a first optical means compensating the thermally-induced optical power of the first solid-state medium.

3. A laser system comprising in combination a solid state active medium located within an optical resonator, pumping means for exciting said active medium thereby generating laser radiation within said optical resonator, means for coupling out of the resonator part of said radiation as oscillator beam; and a second solid state active medium positioned external to said optical resonator, pumping means for exciting the said second active medium thereby amplifying said oscillator beam to an amplified output beam and means for operating said system over a range of varying pumping power and in a range of repetition rates whereby the pumping by said pumping means induces optical lensing in both active media, of optical power varying between a minimum value $\phi_o^{min}$ and a maximum value $\phi_o^{max}$ in the first medium, and a minimum value $\phi_a^{min}$ and a maximum value $\phi_a^{max}$ in the second medium; said optical power being a function of the average pumping power which is the product of pulse repetition rate and pumping energy per pulse, depending on pumping power and repetition rate, there being provided compensating means for balancing said lensing, said compensating means comprising a first optical means with an optical power of minus $\phi_o^{min}$ within said optical resonator, and a second optical means with an optical power of minus $\phi_a^{max}$ external said optical resonator; the amplified output beam being of essentially constant divergence over the range of pumping power and repetition rates at which the system is operated.

4. A laser system according to claim 3, wherein said oscillator beam passes more than once through said second active medium thereby achieving more amplification and higher output energy.

5. A laser system according to claim 3, wherein said pumping energies $E_o$ and $E_a$ of first and second active media respectively are designed to approximately satisfy the condition $$E_o/E_a^2 \simeq (KL/D_o^2)(R^{max}-R^{min})$$

where
   L is the length of said optical resonator
   $D_o$ is the diameter of said oscillator beam
   K is a constant characteristic to said active media
   $R^{min}$ and $R^{max}$ are respectively the lowest and highest repetition rates at which said system is designed to operate.

6. A laser system according to claim 3, wherein the optical means in the resonator is a lens or a beam expander.

7. A laser system according to claim 3, wherein optical means external the resonator is a lens or a beam expander.

8. A laser system according to claim 3, wherein said first and second active media are identical.

9. A laser system according to claim 8, wherein said first and second active media are enclosed in a common pump cavity using common pumping means for both active media.

10. A laser system according to claim 9, wherein said first and second optical means approximately satisfy the condition $$(D_o/D_a)^4 \simeq L(\phi^{max}-\phi^{min})$$

where
   $D_o$ is the diameter of said oscillator beam in said first active medium.
   $D_a$ is the diameter of said amplified beam,
   $\phi^{min}$ and $\phi^{max}$ are respectively the minimal and maximal values of the optical power induced in said first and second active media.

11. A laser system according to claim 3, wherein said first and second active media are different regions in a single excited solid-state medium.

12. A laser system according to claim 4, wherein said first active medium is the central core of said single excited medium and said second active medium is the surrounding annular region of said single excited medium.

13. A laser system according to claim 11, wherein said first and second optical means approximately satisfy the condition $$(D_o/D_a)^4 \simeq L(\phi^{max}-\phi^{min})$$

where
   $D_o$ is the diameter of said oscillator beam in said first active medium,
   $D_a$ is the diameter of said amplified beam,
   $\phi^{min}$ and $\phi^{max}$ are respectively the minimal and maximal values of the optical power induced in said first and second active media.

14. A laser system comprising in combination a solid state active medium located within an optical resonator, pumping means for exciting said active medium thereby generating laser radiation within said optical resonator, means for coupling out of the resonator part of said radiation as oscillator beam; and a second solid state active medium positioned external to said optical resonator, pumping means for exciting the said second active medium thereby amplifying said oscillator beam to an amplified output beam and means for operating said system over a range of varying pumping power and in a range of repetition rates whereby the pumping by said pumping means induces optical lensing in both active media, of optical power varying between a minimum value $\phi_o^{min}$ and a maximum value $\phi_o^{max}$ in the first medium, and $\phi_a^{min}$ a minimum value $\phi_a^{max}$ in the second medium; said optical power being a function of the average pumping power which is the product of pulse repetition rate and pumping energy per pulse, depending on pumping power and repetition rate, there being provided compensating means for balancing said lensing, said compensating means comprising a first optical means with an optical power of minus $\phi_a^{max}$ external said optical resonator; the amplified output beam being of essentially constant divergence over the range of pumping power and repetition rates at which the system is operated.

* * * * *